United States Patent [19]

Murase et al.

[11] 4,438,262

[45] Mar. 20, 1984

[54] HIGHLY DIELECTRIC POLYSACCHARIDES

[75] Inventors: Ichiki Murase, Ibaraki; Fumio Fujita, Osaka; Toshihiro Ohnishi, Takatsuki; Toshifumi Tamura, Otsu, all of Japan

[73] Assignee: Sumitomo Chemical Company, Limited, Osaka, Japan

[21] Appl. No.: 429,282

[22] Filed: Sep. 30, 1982

[30] Foreign Application Priority Data

Oct. 6, 1981 [JP] Japan ................................ 56-159647
Aug. 27, 1982 [JP] Japan ................................ 57-149449

[51] Int. Cl.$^3$ .................... C08B 11/155; C08B 31/08; C08B 37/02
[52] U.S. Cl. ........................................ 536/43; 127/31; 127/32; 536/44; 536/46; 536/50; 536/51
[58] Field of Search ...................... 536/43, 44, 46, 50, 536/51; 127/31, 32

[56] References Cited

U.S. PATENT DOCUMENTS

| | | | |
|---|---|---|---|
| 2,332,049 | 10/1943 | Bock et al. | 536/43 |
| 3,004,855 | 10/1961 | Smith et al. | 536/50 |
| 3,093,629 | 6/1963 | Fugate et al. | 536/44 |
| 3,341,483 | 9/1967 | Zilkha et al. | 536/44 |
| 3,355,449 | 11/1967 | Inoshita et al. | 536/43 |

FOREIGN PATENT DOCUMENTS

| | | | |
|---|---|---|---|
| 344488 | 3/1931 | United Kingdom | 536/43 |
| 800478 | 8/1958 | United Kingdom | 536/43 |

OTHER PUBLICATIONS

Chemical Abstracts, vol. 78, No. 18, May 7, 1973, Abstract No. 78:11280d.

*Primary Examiner*—Ronald W. Griffin
*Attorney, Agent, or Firm*—Stevens, Davis, Miller & Mosher

[57] ABSTRACT

Highly dielectric organic compounds can be obtained by cyanoethylating a dihydroxyalkylate of a water-soluble polysaccharide or a derivative thereof with acrylonitrile.

15 Claims, No Drawings

HIGHLY DIELECTRIC POLYSACCHARIDES

This invention relates to a highly dielectric organic compound obtained by dihydroxyalkylating a water-soluble polysaccharide or a derivative thereof and then cyanoethylating the dihydroxyalkylate with acrylonitrile as well as to a process for manufacturing the compound.

More specifically, the present invention relates to a highly dielectric organic compound particularly superior in dielectric property, transparency, adhesiveness, etc. which is a cyanoethylate of a dihydroxypropylated polysaccharide as well as to a process for manufacturing the compound.

Polysaccharides and derivatives thereof exist in an innumerable number of kinds and forms, and are utilized extensively in various fields such as the food industry, textile industry, paper industry, and in coatings, adhesives, etc.

Cyanoethylates of saccharose (sucrose), cellulose, hydroxyethyl cellulose, etc. have a relatively high dielectric property and are being used as highly dielectric organic materials in somewhat special applications such as a binder for electroluminescent base material, capacitor, etc.

These cyanoethylates, however, are not fully satisfactory in dielectric property, flexibility, ahesivity with electrodes, etc.

As a result of extensive studies with an objective of developing a material excellent in dielectric property and adhesivity, the present inventors have completed this invention.

An object of the present invention is to provide a highly dielectric compound obtained by dihydroxyalkylating a water-soluble polysaccharide or a derivative thereof and then cyanoethylating the dihydroxyalkylate with acrylonitrile as well as to a process for manufacturing the compound.

Other objects and advantages of the present invention will be apparent from the following descriptions.

In Chemical Abstracts, Vol. 78, 1973, 112880d, there is described a process for manufacturing cellulose cyanoethylglycerol ether which comprises cyanoethylating cellulose glycerol ether with acrylonitrile. However, this process has a drawback in that cellulose glycerol ether as starting material can not be obtained with efficiency industrially. Cellulose glycerol ether is produced by a reaction between cellulose and a specific dihydroxyalkylating agent. It is, however, difficult to conduct this reaction efficiently, because cellulose has a crystalline structure and there is no proper solvent for dissolving the cellulose. In the process of the present invention, there is used, as a starting material, a water-soluble polysaccharide or a derivative thereof, and accordingly, there is no such problem as above.

It is presumed that the excellent dielectric property of the product of the present invention is due to that the limited number of hydroxyl groups in a unit glucose structure or unit furanose structure of a polysaccharide or a derivative thereof as sites for cyanoethylation is increased by dihydroxyalkylation and thereby the concentration of cyanoethyl groups per unit structure of an objective product, namely, a cyanoethylate is significantly increased.

The product of the present invention, namely, a cyanoethylate of a dihydroxyalkylate of a polysaccharide or a derivative thereof also provides excellent adhesivity which is an important requirement, for instance, in a binder for electroluminescent panels, as well as excellent transparency.

As the water-soluble polysaccharide and the derivative thereof which can be used in this invention, there can be mentioned the following compounds.

They are, for instance, disaccharides such as saccharose, lactose, maltose, dextran and cellobiose; pullulan and hydroxyethylated pullylan; natural starches such as potato starch, rice starch, wheat starch, corn starch and sweet potato starch; decomposition products of starches such as soluble starch and dextrin; fractionated starches such as amylose and amylopectin; and starch ethers such as hydroxyethylated starch, hydroxypropylated starch, carboxymethylated starch and carboxyethylated starch.

In addition, as etherified celluloses having a degree of etherification of 0.5 or above, there can be mentioned hydroxyethyl cellulose, hydroxypropyl cellulose and carboxymethyl cellulose.

Pullulan used in this invention is a high molecular, linear polymer in which numerous units of maltotriose (trimer of glucose) are combined due to α-1,6 linkage.

There is no particular limitation to the manufacture of pullulan to be used in this invention. Pullulan can be obtained, for instance, by culturing a strain belonging to the genus pullularia which are incomplete microorganisms and then separating and recovering the formed pullulan as an extracellular tacky substance.

Specifically, pullulan can be obtained by inoculating pulluraria pullulans into a medium containing 10% starch syrup (Dextrose Equivalent=42), 0.5% $K_2HPO_4$, 0.1% NaCl, 0.02% $MgSO_4.7H_2O$, 0.06% $(NH_4)_2SO_4$ and 0.04% yeast extract, culturing the strain with shaking at 24° C. for 5 days and then separating an extracellular tacky substance; or by culturing pullararia pullulans in a medium which uses glucose as a carbon source and then separating the extracellular substance.

If necessary, purified pullulan can be obtained by removing the fungus from the medium by centrifugation and then subjecting the fungus to a methanol treatment for sedimentation. Physical properties of pullulan slightly differ depending upon the kind of strain used. However, any pullulan can be used in this invention. Also, there is no particular limitation to the molecular weight of pullulan to be used in this invention. Furthermore, there can be used even pullulan in which part or all of the hydroxyl groups of the glucose unit are combined with ethylene oxide or propylene oxide.

As the dihydroxyalkylating agent used in this invention, there can be used a compound represented by the general formula [I]

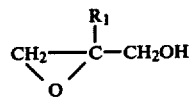

wherein $R_1$ is a hydrogen atom or a methyl group and/or a compound represented by the general formula [II]

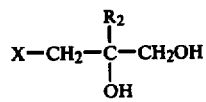

wherein $R_2$ is a hydrogen atom or a methyl group and X is a halogen atom.

As the compound represented by the general formula [I], there can be mentioned, for instance, glycidol, 2-methyl-2,3-epoxy-1-propanol, etc. As the compound represented by the general formula [II], there can be mentioned, for instance, glycerol monohalohydrins such as glycerol monochlorohydrin and glycerol monobromohydrin, 2-hydroxy-2-methyl-3-chloro-1-propanol, 2-hydroxy-2-methyl-3-bromo-1-propanol, etc.

The reaction between the water-soluble polysaccharide or the derivative thereof and the dihydroxyalkylating agent is conducted in a quantity of 0.3–2.0 moles, preferably 0.5–1.2 moles, of the latter based on the hydroxyl groups of the former.

In the above reaction, an alkali or acid catalyst is used. Examples of the alkali catalyst include sodium hydroxide, potassium hydroxide, a sodium alcoholate, a potassium alcoholate, sodium carbonate, potassium carbonate, sodium bicarbonate, sodium oxide, metallic sodium, metallic potassium, sodium amide, benzyl trimethyl ammonium hydroxide, etc. Examples of the acid catalyst include sulfuric acid, hydrochloric acid, nitric acid, perchloric acid, p-toluenesulfonic acid, etc.

As a reaction solvent, there is used water or an organic solvent which is inactive in the reaction such as dimethylformamide, dimethylacetamide, dimethylsulfoxide, etc. Typically, the use of sodium hydroxide (catalyst) and water (solvent) is convenient.

The reaction temperature is in the range of 10° to 120° C. The reaction time is usually between 1 to 10 hours.

The cyanoethylated dihydroxyalkyl polysaccharide according to the present invention can be easily obtained by subjecting the dihydroxyalkylate produced above to cyanoethylation with acrylonitrile in the presence of an alkali catalyst.

At this time, the dihydroxyalkylate can be reacted with acrylonitrile after the separation and purification of the former, or can be reacted immediately after the manufacture of the former without isolating it.

The quantity of acrylonitrile to be used differs owing to the application of the objective cyanoethylated dihydroxyalkyl polysaccharide. However, it is preferable that acrylonitrile be used in a quantity of 1.0 to 10 moles, preferably 1.5 to 5.0 moles based on the hydroxyl groups of the dihydroxyalkylated polysaccharide.

As the alkali catalyst to be used in the cyanoethylation, there can be mentioned, for instance, an alkali metal or a hydroxide thereof such as sodium hydroxide or potassium hydroxide; an alcoholate such as sodium methylate, sodium ethylate or potassium methylate; a carbonate such as sodium carbonate or potassium carbonate; an oxide such as sodium oxide; a cyanide such as sodium cyanide; an amide compound such as sodium amide; a quarternarly ammonium hydroxide such as benzyl trimethyl ammonium hydroxide; etc. From the economical standpoint, it is desirable to use sodium hydroxide.

The reaction between the dihydroxyalkylate and acrylonitrile is conducted preferably in a solvent. There is no particular limitation to the solvent, however, it is preferable that the solvent be capable of dissolving at least one compound of the polysaccharide, the dihydroxyalkylate of the polysaccharide and the cyanoethylate thereof. As the solvent, there can be used, for instance, water, acetone, dioxane, dimethylformamide, dimethylacetamide, dimethyl sulfoxide, acetonitrile and methyl ethyl ketone singly or in a mixture of two or more thereof.

There is no particular limitation to the reaction conditions. However, as the reaction temperature, a temperature in the range of 10° to 200° C. and preferably room temperature to 100° C. is used. The reaction time is 1 to 20 hours and preferably 3 to 10 hours. The reaction pressure may be either normal pressure or an applied pressure.

The cyanoethylate of the dihydroxyalkylated polysaccharide according to the present invention can be used in various applications mainly as a highly dielectric material.

As these applications, there can be mentioned, for instance, electrical parts such as binder for electroluminescent materials and a capacitor. Besides, there are ordinary applications such as film, sheet, coating film and plasticizer. When the compound of the present invention is used, for instance, as a binder for electroluminescent materials, one or two compounds of the present invention or their mixture with conventional cyanoethylated polysaccharides, etc., is used after being usually dissolved in a solvent, or may be used in a molten state.

To such a solution or melt as above, are added a luminescent substance which uses zinc sulfide as a base as well as a fine powder of an excellent dielectric substance such as titanium oxide, lead titanate or barium titanate, and they are mixed and uniformly dispersed to obtain a paste. The paste is applied on transparent electrodes, aluminum plates, etc. to form a thin film for electroluminescent panels.

At this time, additives such as dispersant and viscosity modifier may be added if necessary.

Hereunder, the contents of the present invention will be explained by Examples. However, these examples are presented as illustrative only and do not limit the contents of the present invention.

Parts in Examples refer to parts by weight unless otherwise defined.

EXAMPLE 1

Into a flask provided with a stirrer, there were charged 12 parts of sodium hydroxide, 200 parts of water and 48.6 parts of pullulan, and the pullulan was dissolved. There was added 100 parts of glycidol thereto, and the mixture was subjected to reaction at 45° C. for 5 hr with stirring. After the reaction, 20 parts of glacial acetic acid was added for neutralization. The reaction mixture was poured into acetone with stirring to precipitate dihydroxypropyl pullulan. After repeating the washing of the precipitate with acetone, the precipitate was redissolved in water and then reprecipitated in acetone. The precipitate was filtered and dried under reduced pressure to obtain 53.8 parts of white dihydroxypropyl pullulan. Elementary analysis thereof gave 46.2% for carbon, 7.0% for hydrogen and 0% for ash. Calculation based on these values indicated that the degree of substitution of dihydroxypropyl group in the above compound was 1.6 moles per 1 mole of unit glucose.

Next, into a flask provided with a stirrer, there were charged 1.5 parts of sodium hydroxide, 120 parts of water and 30 parts of the dihydroxypropyl pullulan obtained above, and the dihydroxypropyl pullulan was dissolved. Thereto was added 600 parts of acrylonitrile, and reaction was conducted at 50° C. for 5 hr with stirring.

After the reaction, 2 parts of glacial acetic acid was added thereto for neutralization. The reaction mixture was poured into water with stirring to precipitate cyanoethylated dihydroxypropyl pullulan. After repeating the washing with water, the precipitate was redissolved in acetone and then reprecipitated in water. The precipitate thus obtained was dehydrated and dried under reduced pressure to obtain 45.1 parts of white cyanoethylated dihydroxypropyl pullulan. Elementary analysis thereof indicated that the compound contained 12.1% of nitrogen. Calculation based on this value and the above degree of substitution of dihydroxypropyl groups indicated that the degree of substitution of cyanoethyl groups in this compound was 4.5 moles per 1 mole of unit glucose.

Infrared absorption spectrum obtained for the above synthesized cyanoethylated dihydroxypropyl pullulan showed that there was a sharp and strong absorption based on CN group at 2250 cm$^{-1}$ and a strong absorption based on ether linkage at 1000 to 1100 cm$^{-1}$.

Electrical properties of the synthesized compound are shown in Table 1.

EXAMPLE 2

Into a flask provided with a stirrer, there were charged 6 parts of sodium hydroxide, 100 parts of water and 24.3 parts of pullulan, and the pullulan was dissolved. Thereto was added 50 parts of glycidol, and reaction was conducted at 45° C. for 5 hr with stirring. Then, thereto was added 600 parts of acrylonitrile, and reaction was conducted at 50° C. for 5 hr with stirring. After the reaction, 10 parts of glacial acetic acid was added for neutralization. The reaction mixture was poured into water with stirring to precipitate cyanoethylated dihydroxypropyl pullulan. After repeating the washing with water, the precipitate was redissolved in acetone and reprecipitated in water. Then the precipitate was filtered and dried under reduced pressure to obtain 58.1 parts of white cyanoethylated dihydroxypropyl pullulan. Elementary analysis for this compound showed 54.7% for carbon, 6.4% for hydrogen and 10.7% for nitrogen. Calculation based on these values revealed that the degrees of substitution of dihydroxylpropyl groups and cyanoethyl groups in the compound were 0.99 mole and 3.0 moles, respectively, per 1 mole of unit glucose.

Electrical properties of the compound are shown in Table 1.

Also, adhesivity of the present compound toward an electro-conductive film is shown in Table 2.

EXAMPLE 3

The same procedure as used in Example 1 was repeated except that 100 parts of glycerol-α-monochlorohydrin was employed in place of glycidol.

Elementary analysis for the obtained dihydroxypropyl pullulan and cyanoethylated dihydroxypropyl pullulan showed that the former compound contained 44.8% of carbon and 6.4% of hydrogen and the latter compound contained 55.5% of carbon, 6.1% of hydrogen and 12.3% of nitrogen. Calculation based on these values revealed that the degrees of substitution of dihydroxypropyl groups and cyanoethyl groups in the cyanoethylated dihydroxypropyl pullulan were 0.21 mole and 2.9 moles, respectively, per 1 mole of unit glucose.

Electrical properties of the cyanoethylated dihydroxypropyl pullulan obtained in this Example are shown in Table 1.

COMPARATIVE EXAMPLE 1

Into a flask provided with a stirrer, there were charged 1 part of pullulan and 10 parts of an aqueous 5% sodium hydroxide solution. After the pullulan was dissolved, thereto was added a mixture of 7.5 parts of acrylonitrile and 7.5 parts of acetone. The mixture was subjected to reaction at room temperature (15° to 20° C.) for 24 hr.

To this reaction mixture was added 0.75 part of glacial acetic acid for neutralization. Then, the mixture was poured into water with vigorous stirring to precipitate cyanoethylated pullulan. After repeating the washing with pure water, the precipitate was redissolved in acetone and reprecipitated in water. The precipitate thus formed was dehydrated and dried under reduced pressure to obtain 1.66 parts of purified white cyanoethylated pullulan.

Elementary analysis thereof showed that this compound contained 12.3% of nitrogen. Calculation using this value showed that the degree of substitution of cyanoethyl groups in the compound was 2.7 moles per 1 mole of unit glycose.

Electrical properties and adhesivity of the present compound are shown in Tables 1 and 2, respectively.

EXAMPLE 4

Into a flask provided with a stirrer, there were charged 12 parts of water and 60 parts of D-(+)-saccharose. After the saccharose was dissolved, thereto was added 5.0 parts of an aqueous 20% by weight of sodium hydroxide solution. Further, with stirring, 116 parts of glycidol was added. The mixture was subjected to reaction at 35° to 42° C. for 8 hr. A part of the reaction mixture was taken and neutralized with glacial acetic acid. Then, the solution was diluted with water and acetone was added thereto to form a precipitate. The precipitate was redissolved in water and reprecipitated in acetone. The precipitate thus formed was filtered and dried under reduced pressure to obtain a colorless, transparent, highly viscous material. This material had a hydroxyl value of 1020 KOH mg/g and was confirmed to be glycerinated almost completely.

Subsequently, to 100 parts of the above reaction mixture while being stirred was added 247 parts of acrylonitrile, and it was subjected to reaction at 35° to 40° C. for 6 hr.

The reaction mixture was neutralized with glacial acetic acid and unreacted acrylonitrile was removed under reduced pressure. Then, the remaining mixture was washed with water, a 50/50 mixture of water and acetone, and methanol, in this order, and dried under reduced pressure to obtain 120 parts of a colorless, transparent, viscous liquid.

This liquid had a hydroxyl value of almost zero and infrared absorption spectrum for the liquid indicated that an intended substance was obtained.

Elementary analysis showed that the liquid contained 56.4% of carbon, 7.8% of hydrogen and 12.9% of nitrogen. Calculation based on the hydroxyl value of the above glycerinate and the elementary analysis values of the cyanoethylate revealed that the degree of substitution of the cyanoethyl groups in the intended substance was 12.9 moles per 1 mole of saccharose.

Electrical properties of the cyanoethylate of the glycerinated saccharose obtained in this Example and a cyanoethylated saccharose (commercial grade) as a control are shown in Table 1.

EXAMPLE 5

Into a flask provided with a stirrer, there were charged 50 parts of soluble starch and 119 parts of water. After the starch was dissolved with heating, thereto was added 5.0 parts of an aqueous 20% by weight of sodium hydroxide solution. At 60° to 65° C., 76.5 parts of glycidol was further added. At the same temperature, the mixture was subjected to reaction for 6 hr.

A part of the reaction mixture was taken and neutralized with glacial acetic acid. Thereto was added acetone to precipitate a polymer portion. The polymer was washed with acetone, redissolved in water and reprecipitated in acetone. The polymer thus formed was dried under reduced pressure to obtain a white solid. By elementary analysis it was found that the solid had 46.2% of carbon, 7.0% of hydrogen and 0% of ash.

Next, to 200 g of the above reaction mixture while being stirred at 45° to 50° C. was added 255 parts of acrylonitrile and they were subjected to reaction at the same temperature for 8 hr.

After the reaction, the reaction mixture was neutralized with glacial acetic acid and unreacted acrylonitrile was removed therefrom under reduced pressure.

Then, the mixture was washed with water, a water-methanol mixture and methanol in this order, and dried under reduced pressure to obtain 97 parts of a slightly yellowish white, semitransparent solid.

Infrared absorption spectrum for this solid gave, as in Example 1, a sharp and strong absorption based on CN group at 2250 cm$^{-1}$ and a broad and strong absorption based on ether linkage at 1000 to 1100 cm$^{-1}$. By elementary analysis it was found that the solid contained 55.1% of carbon, 6.5% of hydrogen and 10.9% of nitrogen. Calculation based on the elementary analysis values of the above glycerinate and the solid revealed that the degrees of substitution of dihydroxypropyl groups and cyanoethyl groups in the solid were 1.7 moles and 3.8 moles, respectively, per 1 mole of unit glucose.

Electrical properties of this solid are shown in Table 1, and adhesion of the solid is shown in Table 2.

EXAMPLE 6

Into a flask provided with a stirrer, there were charged 20 parts of soluble starch and 60 parts of water. After the starch was dissolved with heating, thereto were added 15 parts of an aqueous 40% by weight of sodium hydroxide solution and 62 parts of glycerol-α-monochlorohydrin. The mixture was subjected to reaction at 70° to 75° C. for 8 hr.

After the reaction, the reaction mixture was neutralized with glacial acetic acid and then poured into acetone to form a precipitate. The precipitate was redissolved in water and reprecipitated in acetone, and dried under reduced pressure to obtain 16 parts of a white solid.

Twelve parts of this solid product was dissolved in 40 parts of water. Thereto was added 3.0 g of an aqueous 20% sodium hydroxide solution, and at 35° to 40° C., 100 g of acrylonitrile was added. The mixture was subjected to reaction for 8 hr at the same temperature.

After the reaction, the same post-treatment as in Example 2 was conducted to obtain 8.0 parts of a dried white solid polymer.

Elementary analysis values of the dihydroxypropylate obtained and the cyanoethylate thereof were 44.9% for carbon and 6.4% for hydrogen, and 55.8% for carbon, 6.0% for hydrogen and 12.45% for nitrogen, respectively.

Calculation based on these values revealed that the degrees of substitution of dihydroxypropyl groups and cyanoethtl groups in the white solid polymer were 0.3 mole and 3.1 mole, respectively, per 1 mole of unit glucose.

Electrical properties of the solid polymer are shown in Table 1.

EXAMPLE 7

Into a flask provided with a stirrer, there were charged 238 parts of water and 50 parts of hydroxyethyl cellulose (registered trade name Fujihec AL-15, manufactured by Fuji Chemical Co., degree of substitution: 1.6 to 1.8). After the hydroxyethyl cellulose was dissolved with heating, thereto was added 5.0 parts of an aqueous 20% sodium hydroxide solution, and further at 65° to 70° C. with stirring, 52 parts of glycidol was added. The mixture was subjected to reaction for 6.5 hr at the same temperature.

A part of the reaction mixture was taken and neutralized with glacial acetic acid. To the mixture was added acetone to form a precipitate. The precipitate was redissolved in water and reprecipitated in acetone, and dried under reduced pressure to obtain a light yellowish white solid.

By elementary analysis, it was found that the solid contained 48.0% of carbon, 7.5% of hydrogen and 0% of ash.

Subsequently, to 200 parts of the above reaction mixture while being stirred at 35° to 45° C. was added 206 parts of acrylonitrile, and they were subjected to reaction for 10 hr at the same temperature.

Then, the reaction mixture was neutralized with glacial acetic acid, and unreacted acrylonitrile was removed under reduced pressure.

The condensate was washed with water and methanol in this order, and subjected to purification by reprecipitation with acetone and methanol to obtain 58 parts of a white solid.

Infrared absorption spectrum of this solid showed strong absorptions at 2250 cm$^{-1}$ (CN group) and 1000 to 1100 cm$^{-1}$ (ether linkage).

By elementary analysis, it was found that the solid contained 55.1% of carbon, 6.9% of hydrogen and 9.7% of nitrogen. Calculation based on these values and the above analytical values revealed that the degrees of substitution of dihydroxypropyl groups and cyanoethyl groups in the white solid were 1.9 moles and 4.1 moles, respectively, per unit structure of hydroxyethylated glucose.

Electrical properties of the white solid and a cyanoethylated hydroxyethyl cellulose (commercial grade) as a control are shown in Table 1.

Adhesion of the caynoethylate of the glycerinated hydroxyethyl cellulose obtained in this Example is shown in Table 2.

TABLE 1

| Example No. | Compound name | Relative dielectric constant | tan δ |
|---|---|---|---|
| 1 | Cyanoethylated dihydroxypropyl pullulan | 37.2 | 0.020 |
| 2 | " | 39.8 | 0.025 |
| 3 | " | 26.3 | 0.015 |
| 4 | Cyanoethylate of glycerinated saccharose | 46.0 | 0.045 |
| 5 | Cyanoethylate of glycerinated soluble starch | 39.0 | 0.076 |
| 6 | " | 22.5 | 0.064 |
| 7 | Cyanoethylate of glycerinated hydroxyethyl cellulose | 34.0 | 0.047 |
| Comparative Example 1 | Cyanoethylated pullulan | 20.0 | 0.018 |
| Control | Cyanoethyl saccharose | 37.0 | 0.095 |
| Control | Cyanoethylated hydroxyethyl cellulose | 17.0 | 0.053 |

Test method for measuring electrical properties:

In the cases of cyanoethylated saccharoses of Example 4 and Control, a specially manufactured cell (electrode: 34×25 mm, thickness: 3 mm) was used. In other cases, a film of 1.5 to 2 mm thick prepared by a heat and pressure molding as well as an aluminum foil electrode were used. Measurement was made at room temperature at 1 K Hz. The tester was Multi-Frequency LCR Meter manufactured by Yokogawa Hewlett Packard Co.

TABLE 2

| Example No. | Compound name | Adhesion toward electro-conductive film |
|---|---|---|
| 2 | Cyanoethylated dihydroxypropyl pullulan | 100/100 |
| 5 | Cyanoethylate of glycerinated soluble starch | 100/100 |
| 7 | Cyanoethylate of glycerinated hydroxyethyl cellulose | 98/100 |
| Comparative Example 1 | Cyanoethylated pullulan | 90/100 |
| Control | Cyanoethylated cellulose (commercial product) | 0/100 |

Test method for adhesion toward electroconductive film

A test sample was dissolved in dimethylformamide to obtain a solution containing 30% by weight of the sample.

This sample solution was applied on the treated surface for electroconductivity of a transparent, electroconductive film (Highbeam ® 75L-BL 02 manufactured by Toray Industries Inc.) by the use of an applicator. By drying for 2 hr in a drier in which hot air of 100° C. was circulated, a transparent film of about 20μ thick was formed.

Then, with a cutting knife, this thin film was cut to a depth reaching the substrate in a gridiron shape (11 lines both crosswise and lengthwise). Intervals of two neighbouring lines were 1 mm. Subsequently, a cellophane tape was attached on the thin film surface. The tape was quickly peeled off to evaluate adhesion.

Evaluation was made according to the number of squares from which the tape was not peeled off. When the number of these squares was 70, adhesivity was reported as "70/100".

What is claimed is:

1. A process for manufacturing a highly dielectric organic compound which comprises reacting a water-soluble polysaccharide or a derivative thereof with a dihydroxyalkylating agent to form a dihydroxyalkylate and then cyanoethylating the dihydroxyalkylate with acrylonitrle.

2. A process according to claim 1, wherein the dihydroxyalkylating agent is compound represented by the general formula [I],

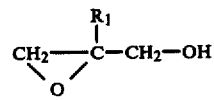

wherein $R_1$ is a hydrogen atom or a methyl group, or a compound represented by the general formula [II],

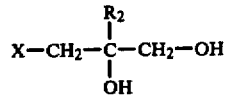

wherein $R_2$ is a hydrogen atom or a methyl group and X is a halogen atom.

3. A process according to claim 1, wherein the water-soluble polysaccharide is saccharose, pullulan, or a starch and the derivative thereof is a hydroxyethylated pullulan, a hydroxyalkyl etherified starch, a carboxyalkyl etherified starch, a hydroxyalkyl cellulose having a degree of etherification of 0.5 or above or a carboxyalkyl cellulose.

4. A process according to claim 2, wherein the dihydroxyalkylating agent represented by the general formular [I] is glycidol or 2-methyl-2,3-epoxy-1-propanol and the dihydroxyalkylating agent represented by the general formula [II] is glycerol monochlorohydrin, glycerol monobromohydrin, 2-hydroxy-2-methyl-3-chloro-1-propanol or 2-hydroxy-2-methyl-3-bromo-1-propanol.

5. A process according to claim 1, wherein the reaction between the water-soluble polysaccharide or the derivative thereof and the dihydroxyalkylating agent is conducted at 10° to 120° C. for 1 to 10 hours in a solvent in the presence of an alkali or acid catalyst.

6. A process according to claim 5, the water-soluble polysaccharide or the derivative thereof and the dihydroxyalkylating agent are reacted in a quantity of 0.3–2.0 moles of the latter based on the hydroxyl groups of the former.

7. A process according to claim 5, wherein the alkali catalyst is sodium hydroxide, potassium hydroxide, a sodium alcoholate, a potassium alcoholate, sodium carbonate, potassium carbonate, sodium bicarbonate, sodium oxide, metallic sodium, metallic potassium, sodium amide or benzyl trimethyl ammonium hydroxide.

8. A process according to claim 5, wherein the acid catalyst is sulfuric acid, hydrochloric acid, nitric acid, perchloric acid or p-toluenesulfonic acid.

9. A process according to claim 5, wherein the reaction between the water-soluble polysaccharide or the derivative thereof and the dihydroxyalkylating agent is conducted in water in the presence of sodium hydroxide.

10. A process according to claim 1, wherein the cyanoethylation with acrylonitrile for the dihydroxyalkylate of the water-soluble polysaccharide or the derivative thereof is conducted at 10° to 200° C. for 1 to 20 hours in a solvent in the presence of an alkali catalyst.

11. A process according to claim 1, wherein acrylonitrile is used in a quantity of 1.0 to 10 moles based on the hydroxyl groups of the dihydroxyalkylated polysaccharide.

12. A process according to claim 10, wherein the alkali catalyst is a hydroxide, alcoholate, carbonate, oxide or cyanide of an alkali metal, or sodium amide, or a quarternary ammonium hydroxide.

13. A process according to claim 10, wherein the alkali catalyst is sodium hydroxide.

14. A process according to claim 10, wherein the solvent is at least one member selected from the group consisting of water, acetone, dioxane, dimethylformamide, dimethylacetamide, dimethyl sulfoxide, acetonitrile and methyl ethyl ketone.

15. A cyanoethylate of a dihydroxyalkylate of a water-soluble polysaccharide or a derivative thereof.

* * * * *